US010903514B2

(12) United States Patent
Patterson, Jr. et al.

(10) Patent No.: US 10,903,514 B2
(45) Date of Patent: Jan. 26, 2021

(54) FUEL CELL MANIFOLD ASSEMBLY INCLUDING A SELF-SUPPORTING POLYMER MATERIAL LINER

(71) Applicant: DOOSAN FUEL CELL AMERICA, INC., South Windsor, CT (US)

(72) Inventors: Timothy William Patterson, Jr., West Hartford, CT (US); Kristoffer H. Ridgeway, Simsbury, CT (US); Chandrasekhar V. Nori, Ellington, CT (US); Eric J. O'Brien, Tolland, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 133 days.

(21) Appl. No.: 16/197,881

(22) Filed: Nov. 21, 2018

(65) Prior Publication Data

US 2019/0097254 A1 Mar. 28, 2019

Related U.S. Application Data

(62) Division of application No. 15/242,846, filed on Aug. 22, 2016, now Pat. No. 10,177,397.

(51) Int. Cl.
*H01M 8/2484* (2016.01)
*H01M 8/086* (2016.01)
*H01M 8/04082* (2016.01)

(52) U.S. Cl.
CPC ..... *H01M 8/2484* (2016.02); *H01M 8/04201* (2013.01); *H01M 8/086* (2013.01)

(58) Field of Classification Search
CPC ............. H01M 8/2484; H01M 8/2485; H01M 8/04201; H01M 8/086

(Continued)

(56) References Cited

U.S. PATENT DOCUMENTS 4,212,929 A 7/1980 Graystad et al.
6,245,454 B1 6/2001 Gocho et al.
(Continued)

FOREIGN PATENT DOCUMENTS

JP 60124363 A * 7/1985 .......... H01M 8/2485
JP S61173469 A 8/1986
(Continued)

OTHER PUBLICATIONS

International Preliminary Report on Patentability for International application No. PCT/US2017/047338 dated Mar. 7, 2019.
(Continued)

*Primary Examiner* — Gregg Cantelmo
(74) *Attorney, Agent, or Firm* — Carlson, Gaskey & Olds

(57) ABSTRACT

An illustrative example fuel cell manifold assembly includes a metal manifold pan. A polymer material liner that is self-supporting includes a primary wall situated adjacent an interior of the manifold pan. The liner has a channel around a periphery of the liner and a portion of the manifold is received in the channel. A reactant conduit adapter is received through respective openings in the manifold pan and the liner. The reactant conduit adaptor includes a flange that is received against an interior surface on the primary wall of the liner with an interface between the flange and the interior surface being sealed. Another portion of the reactant conduit adaptor is adjacent an exterior of the manifold pan that faces in an opposite direction from the interior surface on the primary wall.

16 Claims, 3 Drawing Sheets

(58) Field of Classification Search
USPC .................................................. 429/458, 459
See application file for complete search history.

(56) References Cited

U.S. PATENT DOCUMENTS

| | | |
|---|---|---|
| 6,410,177 B1 | 6/2002 | Iyasu et al. |
| 7,771,519 B2 | 8/2010 | Carolan et al. |
| 7,807,316 B2 | 10/2010 | Andreas-Schott et al. |
| 2003/0124409 A1 | 7/2003 | Cramer et al. |
| 2006/0141325 A1 | 6/2006 | Hansell et al. |
| 2011/0200904 A1 | 8/2011 | Guthrie |

FOREIGN PATENT DOCUMENTS

| | | | | |
|---|---|---|---|---|
| JP | 63098970 A | * | 4/1988 | .......... H01M 8/2485 |
| JP | 08241728 A | * | 9/1996 | |
| JP | 2014-082199 A | | 5/2014 | |

OTHER PUBLICATIONS

International Search Report and Written Opinion of the International Searching Authority for International application No. PCT/US2017/047338, dated Nov. 27, 2017.
Extended European Search Report for Application No. EP 17 84 4163 dated Mar. 16, 2020.

* cited by examiner

000
FUEL CELL MANIFOLD ASSEMBLY INCLUDING A SELF-SUPPORTING POLYMER MATERIAL LINER

CROSS REFERENCE TO RELATED APPLICATION

This application is a divisional of U.S. patent application Ser. No. 15/242,846, filed on Aug. 22, 2016, now U.S. Pat. No. 10,177,397 issued Jan. 8, 2019.

BACKGROUND

Fuel cell devices provide electricity based on an electrochemical reaction. Some fuel cell arrangements utilize phosphoric acid as an electrolyte. Such fuel cells are often referred to as phosphoric acid fuel cells (PAFC).

Fuel cell power plants typically include cell stack assemblies having multiple fuel cells. A manifold may be situated along at least one side of the cell stack assembly for directing reactants to the fuel cells. In some PAFCs, the manifolds are carbon steel and have to be protected from the phosphoric acid. A common approach includes electrostatically coating the manifold pan with a perfluoroalkoxy polymer resin (PFA) coating. While such coatings provide a useful acid barrier and serve as a dielectric barrier on the metal manifold pan, utilizing such coatings introduces additional expense. Multiple coating and sintering steps typically are required to develop a coating that is thick enough to be an effective barrier.

An alternative approach is suggested in U.S. Pat. No. 6,245,454. According to that document, a resin sheet may be situated inside of a manifold pan instead of applying a coating to the pan. That approach is not without difficulties because the installation technique can be cumbersome and the dimensional relationship of the resin sheet to the manifold pan has to accommodate for different thermal expansions of the materials.

It would be useful to have an acid proof dielectric layer for a fuel cell manifold that does not have the expense or complications associated with previous approaches.

SUMMARY

An illustrative example fuel cell manifold assembly includes a metal manifold pan. A polymer material liner that is self-supporting includes a primary wall situated adjacent an interior of the manifold pan. The liner has a channel around a periphery of the liner and a portion of the manifold is received in the channel A reactant conduit adapter is received through respective openings in the manifold pan and the liner. The reactant conduit adaptor includes a flange that is received against an interior surface on the primary wall of the liner with an interface between the flange and the interior surface being sealed. Another portion of the reactant conduit adaptor is adjacent an exterior of the manifold pan that faces in an opposite direction from the interior surface on the primary wall.

An illustrative example method of assembling a fuel cell manifold device includes situating a self-supporting polymer liner adjacent an interior of a metal manifold pan with an edge of the manifold pan received at least partially in a channel around the periphery of the liner. A portion of a reactant conduit adaptor is inserted through an opening in the liner and the manifold pan until a flange on the reactant conduit adaptor is received against an interior surface on the liner. The flange has an outside dimension that is larger than the opening. The flange is then secured to the manifold pan with the liner between the flange and the manifold pan. An interface between the flange and the liner is sealed when the flange is secured.

Various features and advantages of at least one disclosed example embodiment will become apparent to those skilled in the art from the following detailed description. The drawings that accompany the detailed description can be briefly described as follows.

DETAILED DESCRIPTION

Figure 1:
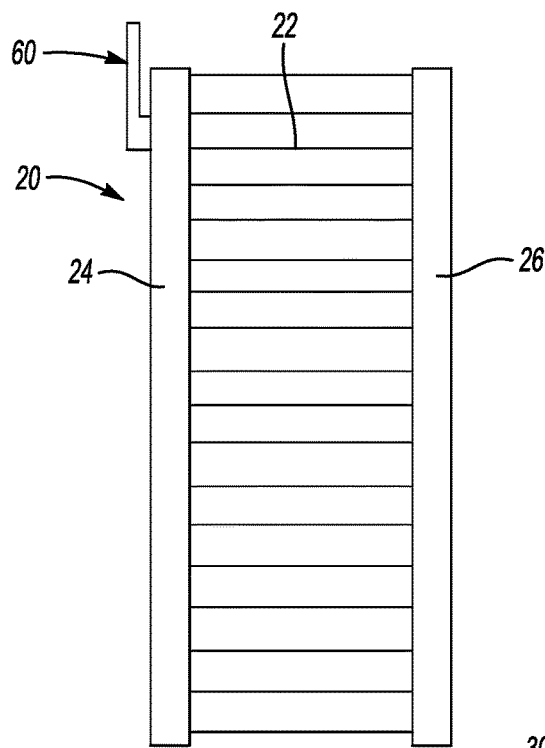
FIG. 1 schematically illustrates selected portions of an example fuel cell arrangement including a manifold assembly designed according to an embodiment of this invention.

FIG. 1 schematically illustrates selected portions of a fuel cell power plant 20 for generating electricity based on an electrochemical reaction. A plurality of individual fuel cells are assembled in a known manner in a cell stack assembly 22. A manifold assembly 24 situated along one side of the cell stack assembly 22 facilitates providing reactant to the fuel cells. Another manifold assembly 26 is provided on another side of the cell stack assembly 22.

Figure 2:
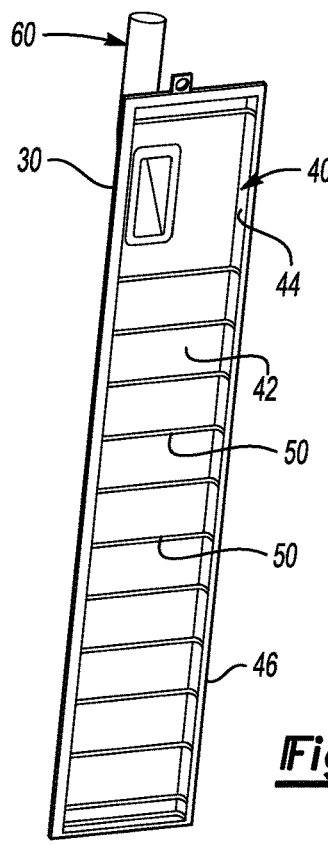
FIG. 2 illustrates an example manifold assembly designed according to an embodiment of this invention.
Figure 3:
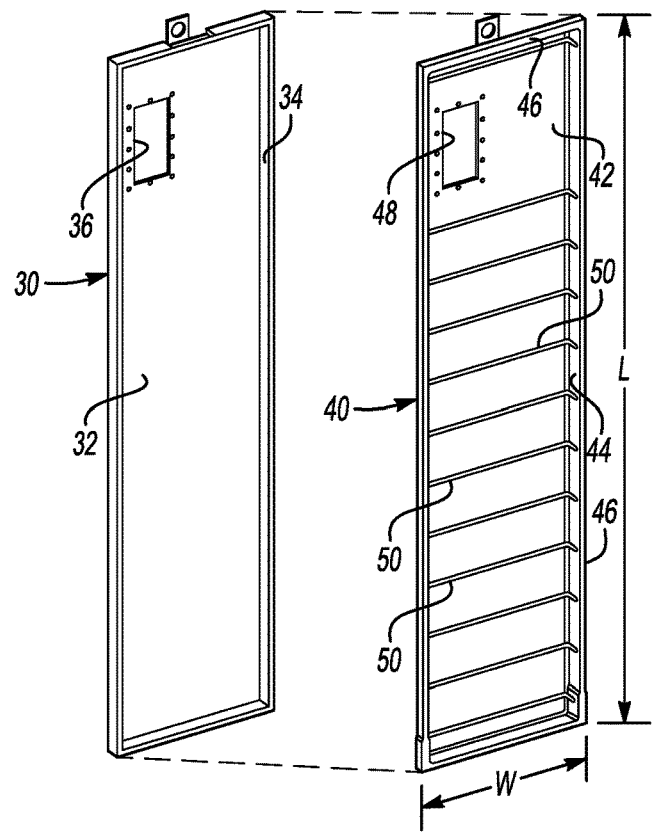
FIG. 3 illustrates an example manifold pan and self-supporting polymer liner configuration.

Referring to FIGS. 2 and 3, the manifold assembly 24 includes a metal manifold pan 30 that has a primary wall 32 and a plurality of side walls 34 that extend generally perpendicularly from edges of the primary wall 32. The interior surfaces on the primary wall 32 and the side walls 34 define a cavity established by the metal manifold pan 30. The primary wall 32 has an opening 36.

A self-supporting polymer material liner 40 is situated adjacent the interior of the metal manifold pan 30. The liner 40 has a primary wall 42 and a plurality of side walls 44 extending generally perpendicularly from edges of the primary wall 42. Lips 46 at the ends of the side walls 44 distal from the primary wall 42 include a portion that is parallel to the primary wall 42 and a portion that is parallel to the corresponding side wall 44.

The side walls 44 and lips 46 establish a channel around a periphery of the body of the liner 40. The channel faces in an opposite direction from an interior surface on the primary wall 42. In FIGS. 2 and 3, the interior surface of the primary wall 42 is visible. In an assembled condition, at least a portion of the side walls 34 on the manifold pan 30 are received in the channel and the primary wall 42 of the liner 40 is received adjacent the primary wall 32 of the manifold pan 30. An opening 48 in the primary wall 42 is aligned with the opening 36 when the liner 40 and the pan 30 are placed adjacent each other.

The body of the liner 40 has a length L and a width W that is smaller than the length. In some example embodiments, the length is greater than two meters (six feet). The liner 40 is self-supporting or freestanding in that it maintains its shape independent of being received adjacent the manifold pan 30. The liner 40 in this example is made from a thermoplastic polymer that is resistant to acid and water vapor. The polymer material of the liner 40 has good strength at high temperature, is thermoformable, and relatively inexpensive so that the liner 40 establishes an effective acid barrier inside the manifold assembly 24 in an economical manner.

An example material that is useful for example embodiments of the liner 40 is polyphenylsulfone (PPSU). That material is useful because it has good chemical resistance properties, good high temperature properties (e.g., low expansion coefficient and high strength) and is relatively inexpensive. Other embodiments include materials for the liner 40, such as polyether ether ketone (PEEK), polyaryletherketone (PAEK), and polyphenylene sulfide (PPS). Such materials are preferred over polytetrafluoroethylene (PTFE) because the latter does not have adequate high temperature mechanical properties.

An example embodiment includes using a thermoforming technique to form the liner 40, such as drape forming. The thermoforming technique for forming the liner 40 allows for rapid fabrication of the liner, which saves time and manufacturing expense. A thermoforming technique contributes to the self-supporting character of the liner 40. Additionally, the freestanding, self-supporting liner 40 can be quickly and relatively simply assembled with the metal manifold pan 30 during an assembly process.

As used in this description, the terms self-supporting or free-standing mean that the liner has a defined shape and that the liner body is at least capable of maintaining its own shape without requiring another component next to it. For example, the liner body 40 defines a cavity based on its self-supporting character. The self-supporting aspects of the liner include having the sidewalls 44 situated generally parallel to the primary wall 42.

The illustrated example liner 40 includes a plurality of ribs 50 that extend widthwise on the body of the liner 40. The ribs 50 are spaced apart from each other in a lengthwise direction. In the illustrated example, the ribs 50 are approximately six inches (0.15 meters) apart. The ribs 50 provide flexibility to allow for some thermal expansion of the body of the liner 40. The ribs 50 for expansion of material to mitigate thermal expansion effects when the liner 40 is subjected to high temperatures during fuel cell operation. The ribs 50 also reduce deflection of the liner that otherwise would occur as a result of thermal expansion of the polymer when exposed to higher fuel cell operating temperatures. The ribs 50 provide localized regions or areas of the liner 40 that can undergo some thermal expansion while the overall shape of the liner remains unchanged. For example, one or more of the ribs 50 may at least partially flatten out as heat associated with fuel cell operation causes or induces thermal expansion in a lengthwise direction.

Figure 4:
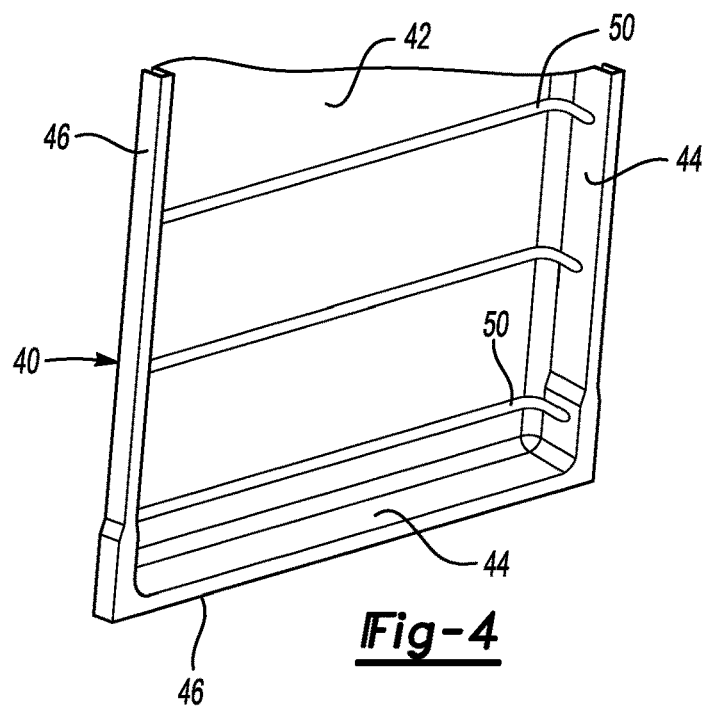
FIG. 4 illustrates selected features of an example liner configuration.
Figure 5:
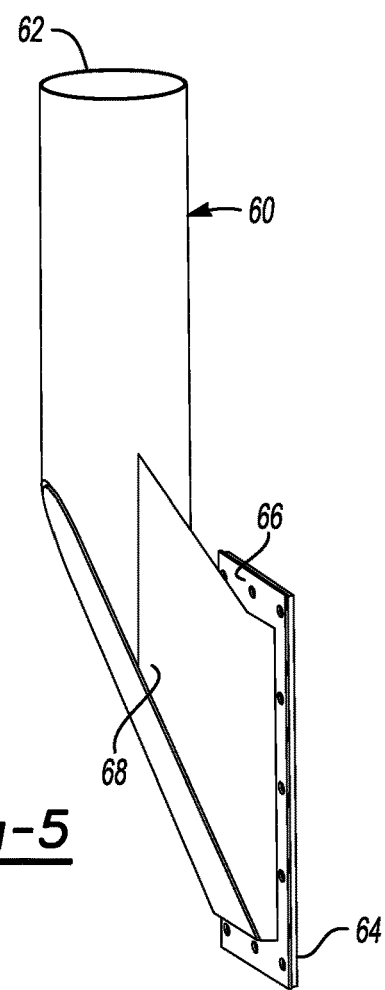
FIG. 5 illustrates an example reactant conduit adaptor.

As shown in FIG. 4, the channel around the periphery of the liner 40 has a larger width near one end of the liner 40. As shown at 54, the channel has a greater width near the bottom (according to the illustration) of the liner body. The wider width in the channel accommodates variations in the manufactured size of a manifold pan 30 or liner 40. In other words, the larger width of the channel near one end of the liner 40 accommodates manufacturing tolerances associated with making the manifold pan 30 and the liner 40 as separate pieces. In some example embodiments, a wider portion of the channel exists near both ends of the liner 40.

Referring to FIGS. 5-8, a reactant conduit adaptor 60 facilitates connecting a source of reactant with the manifold assembly 24. One end 62 of the adaptor 60 is situated on an exterior side of the manifold assembly 24 near an outwardly facing surface of the manifold pan 30. A flange 64 is provided on an opposite end of the adaptor 60 with a seal 66 on one side of the flange 64. The seal 66 may be a separate gasket, a coating or a layer of material on the side of the flange 64 that faces the primary wall 42 of the liner 40. The dimension of the flange 64 is larger than the dimension of the opening 36 in the manifold pan 30 and the opening 48 in the liner 40.

Figure 6:
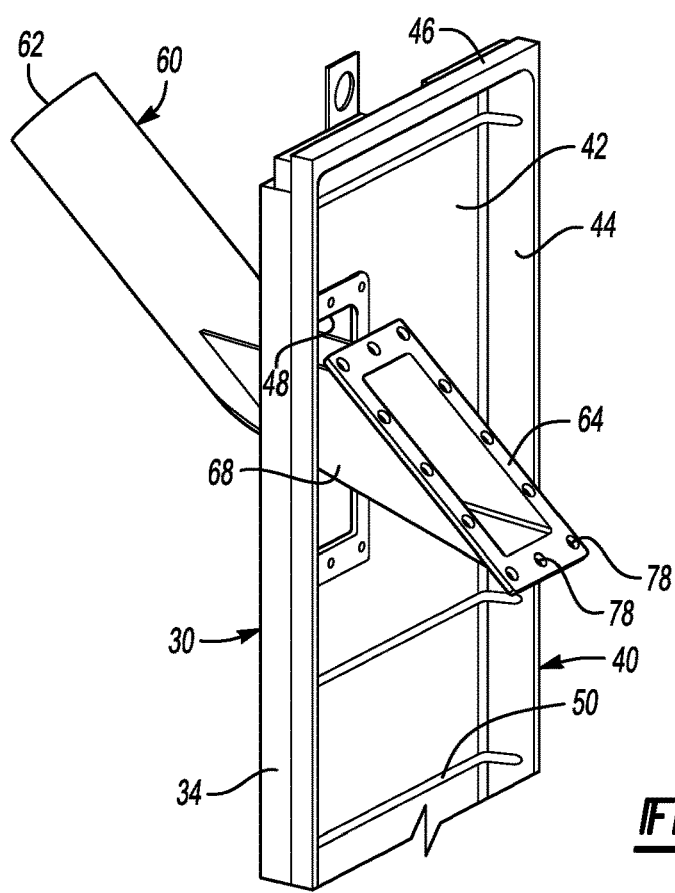
FIG. 6 illustrates a portion of an assembly process for assembling an example manifold device.
Figure 7:
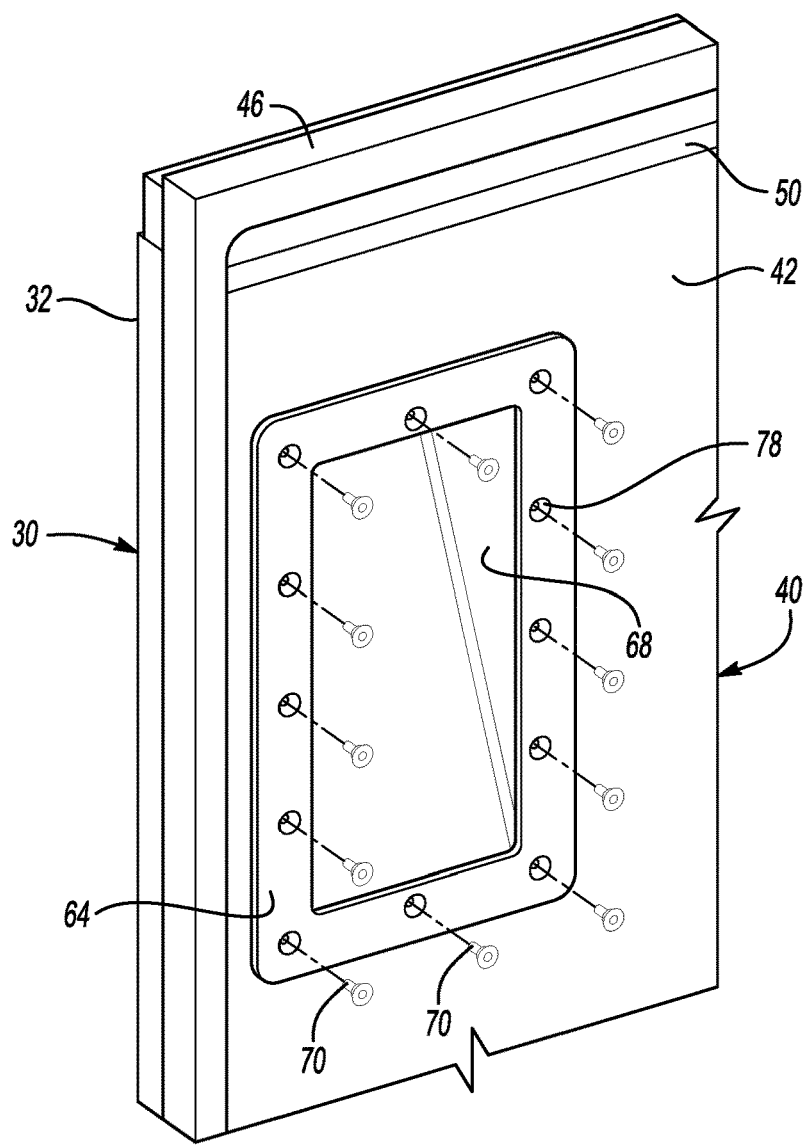
FIG. 7 schematically illustrates another portion of the example assembly process.
Figure 8:
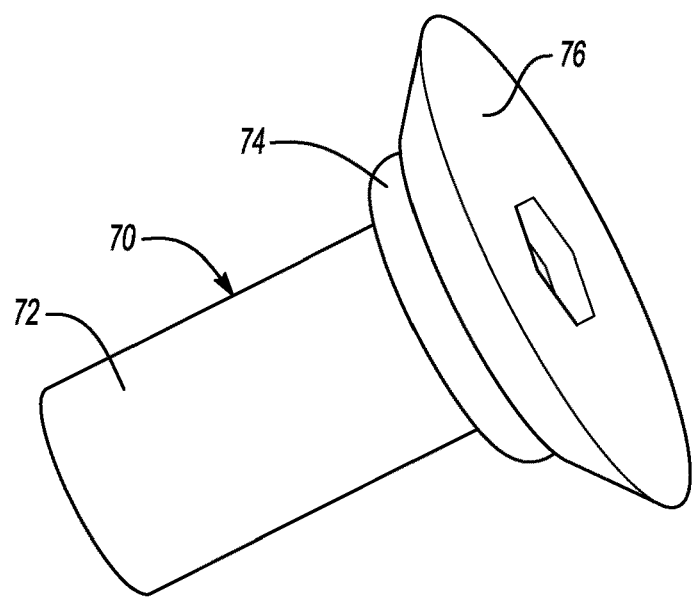
FIG. 8 illustrates an example fastener for securing a conduit reactant adaptor in place within a manifold assembly.

As shown in FIG. 6, the first end 62 is inserted through the openings 38 and 36 from an interior side of the liner 40. A transition portion 68 of the adaptor 60 fits through the openings 36 and 48 and has a portion with an outside dimension that is approximately the same as the size of the openings 36 and 48. The adaptor 60 is manipulated until the flange 64 is received against the interior surface of the primary wall 42 of the liner 40. A plurality of fasteners 70 have a portion 72 that is configured to cooperate with and be secured to the manifold pan 30. In some examples, the portion 72 is threaded and the manifold pan 30 includes threaded holes surrounding the opening 36. The fasteners 70 include a seal 74 that is received against the flange 64 when the fasteners are fully inserted into place to secure the flange 64 against the primary wall 42 of the liner. A head portion 76 on the fastener 70 is larger than the size of holes 78 through the flange 64 to maintain the adaptor 60 in a desired position relative to the manifold pan 30 and liner 40 with an interface between the flange 64 and the interior surface of the primary wall 42 sealed by the seal 66.

A manifold assembly of the type shown in the example embodiment provides cost savings for PAFC systems. The self-supporting, freestanding liner 40 is easier and less expensive to make compared to applying a coating to a metal manifold pan. The time, material and processing savings associated with the liner 40 makes the manifold assembly 24 and the overall PAFC system more economical.

The preceding description is illustrative rather than limiting in nature. Variations and modifications to the disclosed example embodiment may become apparent to those skilled in the art that do not necessarily depart from the essence of this invention. The scope of legal protection given to this invention can only be determined by studying the following claims.

We claim:

1. A fuel cell manifold assembly, comprising:
a metal manifold pan;
a polymer material liner that is self-supporting, the liner including a primary wall situated adjacent an interior of the manifold pan, the liner having a channel around a periphery of the liner, the channel having a first width near one end of the primary wall and a second, larger width near an opposite end of the primary wall, a portion of the manifold pan being received in the channel; and
a reactant conduit adapter that is received through an opening in each of the manifold pan and the liner, the reactant conduit adapter including a flange that is received against an interior surface on the primary wall of the liner with an interface between the flange and the interior surface being sealed, another portion of the reactant conduit adapter is adjacent an exterior of the manifold pan that faces in an opposite direction from the interior surface on the primary wall.

2. The assembly of claim 1, wherein the flange surrounds the opening in the primary wall.

3. The assembly of claim 1, comprising a plurality of fasteners that secure the flange to the manifold pan with a portion of the primary wall between the flange and the manifold pan.

4. The assembly of claim 3, comprising a seal associated with each of the fasteners, each seal being configured to prevent gas or acid migration from inside the liner toward the manifold pan.

5. The assembly of claim 1, wherein the liner includes a plurality of sidewalls, the sidewalls respectively extending generally perpendicularly from the primary wall, the interior surface on the primary wall and interior surfaces on the sidewalls collectively defining a cavity.

6. The assembly of claim 1, wherein
the primary wall has a length and a width that is smaller than the length;
the primary wall includes a plurality of ribs situated widthwise along the primary wall;
the plurality of ribs are spaced apart from each other in a lengthwise direction; and
the plurality of ribs allow for some thermal expansion of the liner body.

7. The assembly of claim 1, comprising a seal between the flange and the interior surface on the primary wall.

8. The assembly of claim 1, wherein the channel faces in an opposite direction from the interior surface of the primary wall.

9. A fuel cell manifold assembly, comprising:
a metal manifold pan;
a polymer material liner that is self-supporting and capable of maintaining its own defined shape independent of any other component of the assembly, the liner including a primary wall situated adjacent an interior of the manifold pan, the liner having a channel around a periphery of the liner, a portion of the manifold pan being received in the channel, the primary wall including a plurality of ribs situated widthwise along the primary wall, the plurality of ribs being spaced apart from each other in a lengthwise direction, the plurality of ribs allowing for some thermal expansion of the liner body; and
a reactant conduit adapter that is received through an opening in each of the manifold pan and the liner, the reactant conduit adapter including a flange that is received against an interior surface on the primary wall of the liner with an interface between the flange and the interior surface being sealed, another portion of the reactant conduit adapter is adjacent an exterior of the manifold pan that faces in an opposite direction from the interior surface on the primary wall.

10. The assembly of claim 9, wherein the primary wall has a length of at least two meters and a width that is smaller than the length.

11. The assembly of claim 9, comprising a seal between the flange and the interior surface on the primary wall.

12. The assembly of claim 9, wherein the channel has a first width near one end of the primary wall and a second, larger width near an opposite end of the primary wall.

13. A fuel cell manifold assembly, comprising:
a metal manifold pan;
a polymer material liner that is self-supporting, the liner including a primary wall situated adjacent an interior of the manifold pan, the liner having a channel around a periphery of the liner, the channel having a first width near one end of the primary wall and a second, larger width near an opposite end of the primary wall, a portion of the manifold pan being received in the channel; and
a reactant conduit adapter that is received through an opening in each of the manifold pan and the liner, the reactant conduit adapter including a flange that is received against an interior surface on the primary wall of the liner with an interface between the flange and the interior surface being sealed, the reactant conduit adapter including a tube shaped portion that is spaced away from an exterior of the manifold pan that faces in an opposite direction from the interior surface on the primary wall.

14. The assembly of claim 13, wherein
the liner is self-supporting and capable of maintaining its own defined shape independent of any other component of the assembly and
the primary wall has a length of at least two meters and a width that is smaller than the length.

15. The assembly of claim 13, wherein
the primary wall includes a plurality of ribs situated widthwise along the primary wall;
the plurality of ribs are spaced apart from each other in a lengthwise direction; and
the plurality of ribs allow for some thermal expansion of the liner body.

16. The assembly of claim 13, comprising
a plurality of fasteners that secure the flange to the manifold pan with a portion of the primary wall between the flange and the manifold pan, and
a seal associated with each of the fasteners, each seal being configured to prevent gas or acid migration from inside the liner toward the manifold pan.

* * * * *